United States Patent
Ko

(10) Patent No.: US 11,860,062 B2
(45) Date of Patent: Jan. 2, 2024

(54) APPARATUS FOR DETECTING COOLANT LEAKAGE

(71) Applicant: LG Chem, Ltd., Seoul (KR)

(72) Inventor: Dong-Wan Ko, Daejeon (KR)

(73) Assignee: LG Energy Solution, Ltd.

( * ) Notice: Subject to any disclaimer, the term of this patent is extended or adjusted under 35 U.S.C. 154(b) by 463 days.

(21) Appl. No.: 16/635,288

(22) PCT Filed: Feb. 20, 2019

(86) PCT No.: PCT/KR2019/002078
§ 371 (c)(1),
(2) Date: Jan. 30, 2020

(87) PCT Pub. No.: WO2019/182253
PCT Pub. Date: Sep. 26, 2019

(65) Prior Publication Data
US 2021/0033483 A1     Feb. 4, 2021

(30) Foreign Application Priority Data

Mar. 21, 2018  (KR) ........................ 10-2018-0032652

(51) Int. Cl.
*G01M 3/16*     (2006.01)
*H01M 10/48*    (2006.01)
(Continued)

(52) U.S. Cl.
CPC ........... *G01M 3/16* (2013.01); *H01M 10/425* (2013.01); *H01M 10/48* (2013.01);
(Continued)

(58) Field of Classification Search
None
See application file for complete search history.

(56) References Cited

U.S. PATENT DOCUMENTS 5,001,928 A * 3/1991 Ogasawara ........... G01F 23/246
                                                          338/80
5,824,883 A    10/1998 Park et al.
(Continued)

FOREIGN PATENT DOCUMENTS

JP    S62174234 U    11/1987
JP    H10115569 A    5/1998
(Continued)

OTHER PUBLICATIONS

EV Connect, How Long Does an Electric Car Battery Last?, Nov. 8, 2021, EV Connect (Year: 2021).*
(Continued)

*Primary Examiner* — Ula C Ruddock
*Assistant Examiner* — Mary Grace Byram
(74) *Attorney, Agent, or Firm* — Lerner David LLP

(57) ABSTRACT

An apparatus for detecting coolant leakage that can accurately detect the coolant leakage height in the process of detecting coolant leakage in the event of coolant leakage in a battery pack. The apparatus can detect leakage of a coolant flowing through a battery, and includes a detection resistor unit provided in the battery pack and including a resistor, the detection resistor unit configured such that the resistor is disposed at different heights from a lower end of the battery pack toward an upper end of the battery pack and the resistor comes into contact with the coolant, a power supply unit configured to supply power to the detection resistor unit, and a detection unit configured to connect to the detection resistor unit, and detect whether the coolant leaks and the coolant leakage height based on an electrical signal received from the detection resistor unit.

13 Claims, 11 Drawing Sheets

(51) Int. Cl.
*H01M 50/569* (2021.01)
*H01M 10/613* (2014.01)
*H01M 10/6567* (2014.01)
*H01M 10/42* (2006.01)
*H01M 50/20* (2021.01)
*H01M 50/204* (2021.01)

(52) U.S. Cl.
CPC ....... *H01M 10/482* (2013.01); *H01M 10/613* (2015.04); *H01M 10/6567* (2015.04); *H01M 50/20* (2021.01); *H01M 50/569* (2021.01); *H01M 50/204* (2021.01); *H01M 2200/00* (2013.01)

(56) References Cited

U.S. PATENT DOCUMENTS

| | | | | |
|---|---|---|---|---|
| 2011/0112782 | A1* | 5/2011 | Majima | H02J 7/0029 324/427 |
| 2012/0105220 | A1 | 5/2012 | Wang | |
| 2012/0251859 | A1 | 10/2012 | Payne et al. | |
| 2013/0003501 | A1* | 1/2013 | Marquez | G01M 3/18 367/83 |
| 2013/0197745 | A1 | 8/2013 | Skelton et al. | |
| 2014/0015511 | A1* | 1/2014 | Matthe | H01M 10/425 324/71.1 |
| 2015/0050526 | A1* | 2/2015 | Kim | H01M 10/425 429/7 |
| 2017/0279169 | A1* | 9/2017 | Obrist | H01M 50/249 |
| 2019/0178697 | A1* | 6/2019 | Yoon | G01F 23/241 |

FOREIGN PATENT DOCUMENTS

| | | |
|---|---|---|
| JP | 2002164070 A | 6/2002 |
| JP | 2007205812 A | 8/2007 |
| JP | 2008039727 A | 2/2008 |
| JP | 4711213 B2 | 6/2011 |
| JP | 4821126 B2 | 11/2011 |
| JP | 2014229421 A | 12/2014 |
| KR | 20070019276 A | 2/2007 |
| KR | 101306201 B1 | 9/2013 |
| KR | 20170130902 A | 11/2017 |

OTHER PUBLICATIONS

JB Tools, Why You Shouldn't Drive a Car with Low/No Coolant, Jan. 23, 2018, JB Tools Inc (Year: 2018).*
International Search Report for Application No. PCT/KR2019/002078 dated May 13, 2019, 2 pages.

* cited by examiner

FIG. 3

| Resistance value(Ω) | Leakage | Leakage height(cm) |     |
|---|---|---|---|
| 3R | × | 0 | ~310 |
| 2R | ○ | h1 | ~320 |
| 1R | ○ | h2 | ~330 |
| 0 | ○ | h3 | ~340 |

APPARATUS FOR DETECTING COOLANT LEAKAGE

CROSS-REFERENCE TO RELATED APPLICATIONS

The present application is a national phase entry under 35 U.S.C. § 371 of International Application No. PCT/KR2019/002078 filed Feb. 20, 2019, published in Korean, which claims priority from Korean Patent Application No. 10-2018-0032652 filed Mar. 21, 2018, all of which are incorporated herein by reference.

TECHNICAL FIELD

The present disclosure relates to an apparatus for detecting coolant leakage, and more particularly, to an apparatus for detecting coolant leakage that can accurately detect the coolant leakage height in the process of detecting coolant leakage in the event of coolant leakage in a battery pack.

BACKGROUND ART

Recently, there is dramatically growing demand for portable electronic products such as laptop computers, video cameras and mobile phones, and with the extensive development of accumulators for energy storage, robots and satellites, many studies are being made on high performance secondary batteries that can be recharged repeatedly.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages of free charging and discharging, a very low self-discharge rate and high energy density.

Batteries are used in various fields, and in many cases, large capacity is required in commercial applications in which batteries are widely used in recent years, such as electric-drive vehicles or smart grid systems. To increase the capacity of battery packs, there may be a method that increases the capacity of secondary batteries or battery cells themselves, but in this case, the capacity increase effect is not so large, and there is a physical limitation on the size expansion of the secondary batteries, and another disadvantage is inconvenient management. Accordingly, generally, a battery pack including a plurality of battery modules connected in series and in parallel is widely used.

In many cases, the battery pack includes a Battery Management System (BMS) to manage the battery modules. Further, the BMS may monitor the temperature, voltage and current of the battery modules, and control the balancing operation, the cooling operation, the charging operation or the discharge operation of the battery pack based on the monitored state of the battery modules.

The temperature of the battery module, or the temperature of the secondary batteries is a factor that has the critical influence on the performance of the battery pack. In general, the battery pack can efficiently operate at optimal temperature distribution of the secondary batteries. For example, when the temperature of the secondary batteries is too high, the performance of the battery pack may degrade due to a reduction in safety of the crystal lattice of the secondary battery negative electrode. Accordingly, it is necessary to properly control the temperature of the secondary batteries.

Generally, to properly maintain the temperature of the secondary batteries, the battery pack has a coolant inside, and is configured to allow the coolant to flow through the secondary batteries. However, when the coolant leaks, the quantity of coolant circulating reduces, failing to maintain the temperature of the secondary batteries. Furthermore, the coolant leaks may cause an electrical incident, which damages the components of the battery pack.

SUMMARY

Technical Problem

The present disclosure is devised under the background of the conventional art as described above, and therefore the present disclosure relates to an improved apparatus for detecting coolant leakage that can effectively detect whether a coolant leaks and the coolant leakage height in the process of detecting coolant leakage.

These and other objects and advantages of the present disclosure will be understood by the following description and will be apparent from the embodiments of the present disclosure. Further, it will be readily understood that the objects and advantages of the present disclosure can be realized by the means set forth in the appended claims and combinations thereof.

Technical Solution

To achieve the above-described object, an apparatus for detecting coolant leakage according to an embodiment of the present disclosure includes at least one resistor provided in a battery pack and configured such that the at least one resistor is disposed at different heights from a lower end of the battery pack toward an upper end of the battery pack, wherein the at least one resistor comes into contact with the coolant, wherein the at least one resistor is configured to be connected to and receive power from a power supply, and a processor configured to receive an electrical signal from the at least one resistor, and detect a coolant leak based on the electrical signal received from the at least one resistor.

Additionally, the at least one resistor may be configured such that a height of a first end of the at least one resistor from the lower end of the battery pack and a height of a second end of the at least one resistor from the lower end of the battery pack are different from each other, and the at least one resistor forms a non-zero angle with the lower end of the battery pack.

Additionally, the at least one resistor may be a plurality of resistors connected in parallel, and at least two resistors of the plurality of resistors may be configured such that respective heights of the at least two resistors from the lower end of the battery pack are different from each other.

Additionally, the at least two resistors may form an angle with the lower end of the battery pack.

Additionally, the at least one resistor may be configured to be mounted in a lower end of a secondary battery provided in the battery pack.

Additionally, the processor may be configured to detect the coolant leak based on a change in resistance value of the at least one resistor indicated by the electrical signal received from the at least one resistor.

Additionally, the processor may be configured to determine a height of the coolant based on a change in resistance value of the at least one resistor.

Additionally, the apparatus may further include memory configured to pre-store the resistance value, a respective coolant height corresponding to the resistance value, and a respective indication of whether there is a coolant leak corresponding to the resistance value, and the processor may be configured to calculate the resistance value of the at least one resistor based on the electrical signal received from the at least one resistor, and detect the coolant leak and determine the coolant height based on the calculated resistance value.

Additionally, the processor may be configured to determine a height of the coolant based on the electrical signal received from the at least one resistor, and detect the coolant leakage based on the determined height of the coolant.

Additionally, the apparatus may include the power supply, and the power supply may be configured to supply power to the at least one resistor.

In addition, to achieve the above-described object, a battery pack according to an embodiment of the present disclosure includes the apparatus for detecting coolant leakage according to any of the embodiments described in the present disclosure.

Advantageous Effects

According to the present disclosure, it is possible to detect whether a coolant leaks in the battery pack. Additionally, it is possible to detect the coolant leakage height in a stepwise manner based on a change in the resistance value of the detection resistor unit. Accordingly, when the apparatus for detecting coolant leakage according to the present disclosure is used, it is possible to achieve cost savings and simple configuration, compared to when a separate coolant leakage detection sensor is used.

Additionally, according to an aspect of the present disclosure, it is possible to reduce a detection error of coolant leakage height.

The present disclosure may have a variety of other effects, and these and other effects can be understood by the following description and will be apparent from the embodiments of the present disclosure.

BRIEF DESCRIPTION OF DRAWINGS

The accompanying drawings illustrate a preferred embodiment of the present disclosure, and together with the following detailed description of the present disclosure, serve to provide a further understanding of the technical aspects of the present disclosure, and thus the present disclosure should not be construed as limited to the drawings.

FIG. 3 is a diagram showing leakage detection data as a function of a resistance value, referred by a detection unit according to an embodiment of the present disclosure.

DETAILED DESCRIPTION

Figure 1:
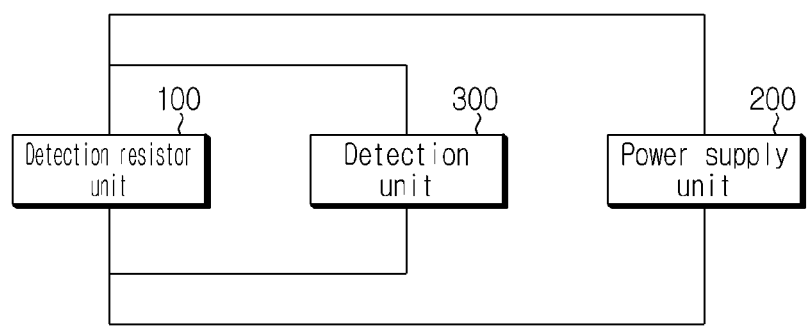
FIG. 1 is a schematic diagram showing a functional configuration of an apparatus for detecting coolant leakage according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could be made thereto at the time of filing the application.

Additionally, in describing the present disclosure, when it is deemed that a certain detailed description of relevant known elements or functions renders the key subject matter of the present disclosure ambiguous, the detailed description is omitted herein.

Unless the context clearly indicates otherwise, it will be understood that the term "comprises" or "includes" when used in this specification, specifies the presence of stated elements, but does not preclude the presence or addition of one or more other elements. Additionally, the term 'detection unit' as used herein refers to a processing unit of at least one function or operation, and this may be implemented by hardware or software alone or in combination.

In addition, throughout the specification, it will be further understood that when an element is referred to as being "connected to" another element, it can be directly connected to the other element or intervening elements may be present.

An apparatus for detecting coolant leakage according to the present disclosure is an apparatus that detects whether a coolant leaks. For example, when the apparatus for detecting coolant leakage according to the present disclosure is mounted in a battery pack of a vehicle, the apparatus for detecting coolant leakage may detect whether a coolant leaks in the battery pack. In more detail, the apparatus for detecting coolant leakage according to the present disclosure may be an apparatus for detecting whether a coolant flowing through a secondary battery provided in the battery pack leaks.

Figure 2:
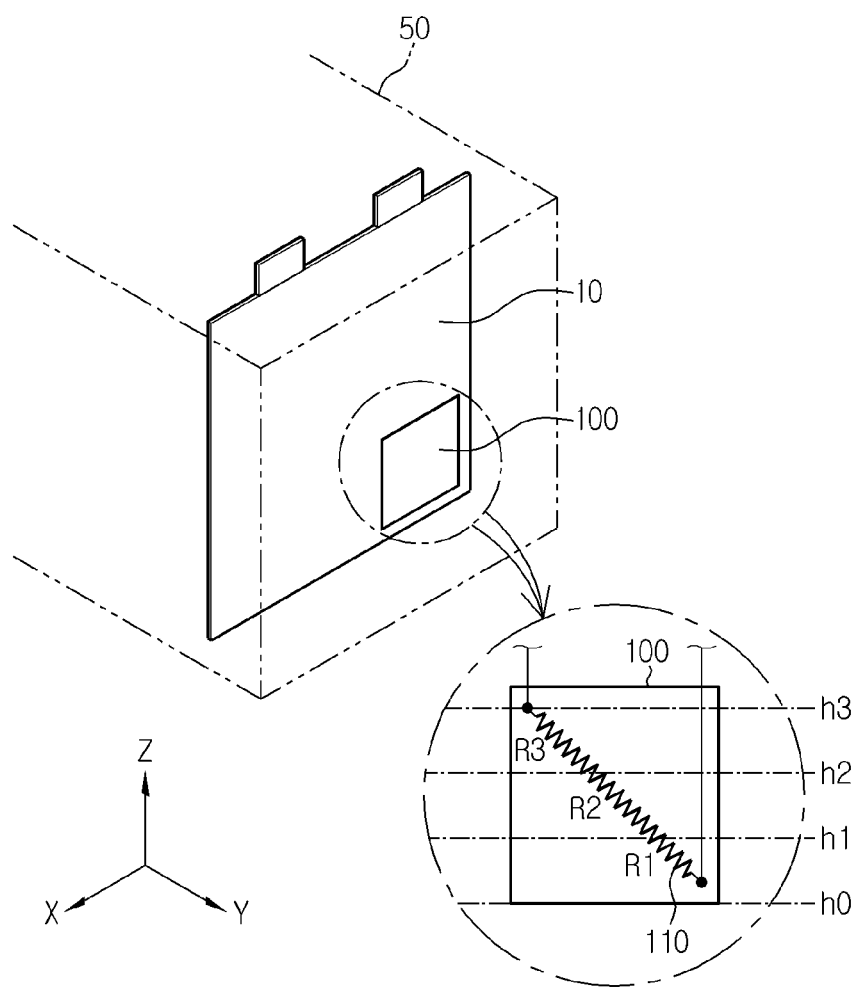
FIG. 2 is a schematic diagram showing a battery pack including a detection resistor unit inside according to an embodiment of the present disclosure.

FIG. 1 is a schematic diagram showing a functional configuration of the apparatus for detecting coolant leakage according to an embodiment of the present disclosure, and FIG. 2 is a schematic diagram showing the battery pack including a detection resistor unit inside according to an embodiment of the present disclosure.

Referring to FIGS. 1 and 2, the apparatus for detecting coolant leakage according to the present disclosure includes a detection resistor unit 100, a power supply unit 200 and a detection unit 300.

The detection resistor unit 100 may be provided in the battery pack 50. For example, the detection resistor unit 100 may be provided in the battery pack 50 mounted in a vehicle.

The detection resistor unit 100 according to an embodiment of the present disclosure may be mounted on the inner surface of the battery pack 50. In more detail, the detection resistor unit 100 may be mounted in the lower end of the battery pack 50 so that the detection resistor unit 100 comes into contact with a coolant when the coolant leaks in the battery pack 50.

The detection resistor unit 100 according to another embodiment of the present disclosure may be mounted on the outer surface of the secondary battery 10 provided in the battery pack 50. For example, as shown in the configuration of FIG. 2, the detection resistor unit 100 may be mounted on the outer surface of the secondary battery 10, and come into contact with a coolant when the coolant leaks in the battery pack 50. Additionally, preferably, the detection resistor unit 100 may be mounted in the lower end of the secondary battery 10 provided in the battery pack 50. For example, as shown in the configuration of FIG. 2, when the secondary battery 10 is mounted in the battery pack 50 in the vertical direction (+z axis direction) of the battery pack 50, the detection resistor unit 100 may be mounted in the lower end of the outer surface of the secondary battery 10 in the vertical direction (+z axis direction) of the battery pack 50.

Additionally, the detection resistor unit 100 may include a resistor. For example, the detection resistor unit 100 may include at least one resistor.

In an embodiment of the present disclosure, the detection resistor unit 100 may include one resistor. Alternatively, the detection resistor unit 100 may include a plurality of resistors connected in series or in parallel. Particularly, when the detection resistor unit 100 includes one resistor, the resistor may be implemented as a variable resistor of which the resistance value changes by the contact with the coolant.

For example, as shown in the configuration of FIG. 2, the detection resistor unit 100 may include one resistor 110. Here, the resistor 110 may be divided into three, a first unit resistor R1, a second unit resistor R2 and a third unit resistor R3, according to the length of the resistor 110. In the embodiment of FIG. 2, a reference height h0 may be a baseline indicating the lowest end of the detection resistor unit 100. Alternatively, the reference height h0 may be a baseline indicating the bottom of the battery pack 50. Additionally, a first height h1 may be a vertical height from the reference height h0 to a location at which one end of the first unit resistor R1 is positioned. Additionally, a second height h2 may be a vertical height from the reference height h0 to a location at which one end of the second unit resistor R2 is positioned. Additionally, a third height h3 may be a vertical height from the reference height h0 to a location at which one end of the third unit resistor R3 is positioned.

Additionally, the resistor 110 may be disposed at different heights from the lower end of the battery pack 50 to the upper end of the battery pack 50. For example, the resistor 110 may have different heights of one end of the resistor 110 and the other end of the resistor 110. In more detail, in the embodiment of FIG. 2, the resistor 110 may be provided such that one end in the first unit resistor R1 direction is disposed at the lower end of the battery pack 50, and the other end in the third unit resistor R3 direction is disposed at the upper end of the battery pack 50.

Preferably, the resistor 110 according to an embodiment of the present disclosure may be configured such that the height of one end of the resistor 110 and the height of the other end of the resistor 110 are different from each other, forming an angle with the bottom of the battery pack 50. For example, as shown in the configuration of FIG. 2, the resistor 110 may configured to form an angle with the bottom of the battery pack 50.

Additionally, the resistor 110 may be configured to come into contact with the coolant leaking in the battery pack 50. For example, the resistor 110 may be mounted on the inner wall of the battery pack 50. Alternatively, the resistor 110 may be mounted on the outer surface of the secondary battery 10.

The power supply unit 200 may be configured to supply power to the detection resistor unit 100. For example, the power supply unit 200 may be implemented as a voltage source configured to apply a predetermined voltage to the detection resistor unit 100. Alternatively, the power supply unit 200 may be implemented as a current source configured to supply a predetermined current to the detection resistor unit 100.

The detection unit 300 may be connected to the detection resistor unit 100. For example, as shown in the configuration of FIG. 1, the detection unit 300 may be electrically directly connected to two ends of the detection resistor unit 100. Alternatively, the detection unit 300 may be electrically directly connected to one end of the detection resistor unit 100.

Additionally, the detection unit 300 may be configured to detect whether the coolant leaks and the coolant leakage height based on an electrical signal received from the detection resistor unit 100. For example, the detection unit 300 may be electrically directly connected to two ends of the detection resistor unit 100, and receive a voltage value applied to the detection resistor unit 100 from the detection resistor unit 100. Alternatively, the detection unit 300 may be electrically directly connected to one end of the detection resistor unit 100, and receive a current value flowing in the detection resistor unit 100 from the detection resistor unit 100. Additionally, the detection unit 300 may detect whether the coolant leaks and the coolant leakage height based on the voltage value or the current value received from the detection resistor unit 100.

FIG. 3 is a diagram showing leakage detection data as a function of a resistance value, referred by the detection unit according to an embodiment of the present disclosure.

Referring to FIGS. 2 and 3, the detection unit 300 according to an embodiment of the present disclosure may be configured to determine the coolant leakage height with a change in the resistance value of the detection resistor unit 100. Additionally, the detection unit 300 may be configured to determine whether the coolant leaks according to a change in the resistance value of the detection resistor unit 100.

For example, the detection unit 300 may pre-store a reference table shown in FIG. 3. In more detail, the detection unit 300 may pre-store whether the coolant leaks and the coolant leakage height, corresponding to a resistance value of the detection resistor unit 100. That is, the detection unit 300 may calculate a resistance value of the detection resistor unit 100 based on the electrical signal received from the detection resistor unit 100, and detect whether the coolant leaks and the coolant leakage height based on the calculated resistance value. Here, the reference table shown in FIG. 3 may be a reference table when the resistance value of the resistor 110 shown in the configuration of FIG. 2 is 3R, and the magnitudes of the resistance values of the first unit resistor R1, the second unit resistor R2 and the third unit resistor R3 are equally R.

In an embodiment of the present disclosure, as shown in Table of FIG. 3, the detection unit 300 may store a first table 310. Here, referring to FIG. 2 together, when the first unit resistor R1, the second unit resistor R2 and the third unit resistor R3 are not in contact with the coolant, the detection unit 300 may determine that the coolant does not leak. In more detail, when the resistance value of 3R is detected from the detection resistor unit 100, the detection unit 300 may determine that the coolant does not leak.

Likewise, the detection unit 300 may store a second table 320. Here, referring to FIG. 2 together, when the first unit resistor R1 is in contact with the coolant and the second unit resistor R2 and the third unit resistor R3 are not in contact with the coolant, the detection unit 300 may determine that the coolant leaked as much as the first height h1. In more detail, when the resistance value of 2R is detected from the detection resistor unit 100, the detection unit 300 may determine that the first unit resistor R1 comes into contact with the coolant and is short-circuited.

Likewise, the detection unit 300 may store a third table 330. Here, referring to FIG. 2 together, when the first unit resistor R1 and the second unit resistor R2 are in contact with the coolant and the third unit resistor R3 is not in contact with the coolant, the detection unit 300 may determine that the coolant leaked as much as the second height h2. In more detail, when the resistance value of 1R is detected from the detection resistor unit 100, the detection unit 300 may determine that the first unit resistor R1 and the second unit resistor R2 come into contact with the coolant and are short-circuited.

Likewise, the detection unit 300 may store a fourth table 340. Here, referring to FIG. 2 together, when the first unit resistor R1, the second unit resistor R2 and the third unit resistor R3 are in contact with the coolant, the detection unit 300 may determine that the coolant leaked as much as the third height h3. In more detail, when the resistance value of 0 is detected from the detection resistor unit 100, the detection unit 300 may determine that the first unit resistor R1, the second unit resistor R2 and the third unit resistor R3 come into contact with the coolant and are short-circuited.

Additionally, when there is a change in the resistance value of the detection resistor unit 100 based on the electrical signal received from the detection resistor unit 100, the detection unit 300 may determine that the coolant leaked in the battery pack 50.

Preferably, the detection unit 300 may determine the resistance value of the detection resistor unit 100 based on the detected voltage value or the detected current value received from the detection resistor unit 100.

In an embodiment of the present disclosure, the detection unit 300 may pre-store a plurality of detected voltage values according to the coolant leakage height. In this instance, when the voltage value measured from the detection resistor unit 100 corresponds to one of the plurality of detected voltage values, the detection unit 300 may determine the coolant leakage height corresponding to the voltage value.

In another embodiment of the present disclosure, the detection unit 300 may pre-store a plurality of detected current values according to the coolant leakage height. In this instance, when the current value measured from the detection resistor unit 100 corresponds to one of the plurality of detected current values, the detection unit 300 may determine the coolant leakage height corresponding to the current value.

For example, the detection unit 300 may selectively include a processor, an Application-Specific Integrated Circuit (ASIC), a chipset, a logic circuit, a register, a communication modem and/or a data processing device, known in the art to perform the above-described operation.

Preferably, the detection unit 300 may include at least one memory unit. That is, at least one memory unit may be embedded in the detection unit 300. The memory unit may pre-store programs and data related to various operations performed by the apparatus for detecting coolant leakage.

Figure 4:
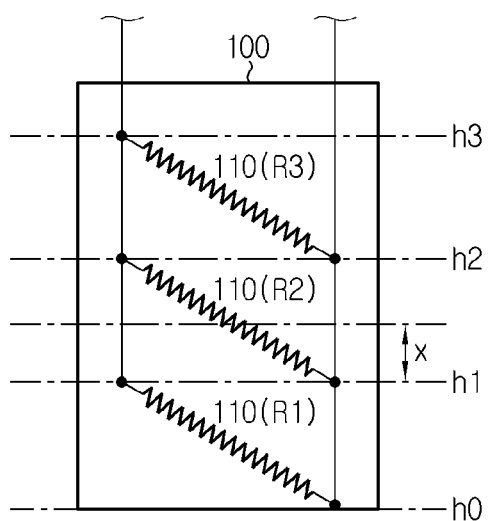
FIG. 4 is a schematic diagram showing a configuration of a detection resistor unit according to an embodiment of the present disclosure.

FIG. 4 is a schematic diagram showing a configuration of the detection resistor unit according to an embodiment of the present disclosure.

Referring to FIG. 4, the detection resistor unit 100 according to an embodiment of the present disclosure may include a plurality of resistors 110. In more detail, the detection resistor unit 100 may include a plurality of resistors 110 connected in parallel. For example, as shown in the configuration of FIG. 4, the detection resistor unit 100 may include a first unit resistor R1, a second unit resistor R2 and a third unit resistor R3 connected in parallel.

Particularly, the plurality of resistors 110 may be configured such that the height of one end of each resistor and the height of the other end of each resistor are different from each other, and each resistor forms an angle with the bottom of the battery pack 50. That is, each of the plurality of resistors 110 may be configured such that the height of one end and the height of the other end are different from each other, forming an angle with the bottom of the battery pack 50. For example, as shown in the configuration of FIG. 4, the first unit resistor R1 may be provided such that one end faces the lower end of the detection resistor unit 100 in the length-wise direction of the first unit resistor R1, and the other end faces the upper end of the detection resistor unit 100 in the length-wise direction of the first unit resistor RE Additionally, the first unit resistor R1 may be provided to form an angle with the bottom of the battery pack 50. That is, the first unit resistor R1 may be provided to form an angle with the bottom of the detection resistor unit 100.

Additionally, the plurality of resistors 110 may be provided such that they are disposed at different heights, forming an angle with the bottom of the battery pack 50. That is, each of the plurality of resistors 110 may have different heights mounted in the detection resistor unit 100. For example, the first unit resistor R1, the second unit resistor R2 and the third unit resistor R3 may be provided at h0~h1, h1~h2 and h2~h3 in that order such that the heights of the first unit resistor R1, the second unit resistor R2 and the third unit resistor R3 are different from one another. That is, the plurality of resistors 110 may be provided in the detection resistor unit 100 such that parts other than two ends do not overlap at the same height. For example, the other end of the first unit resistor R1 and one end of the second unit resistor R2 may be disposed at the height h1, and the other end of the second unit resistor R2 and one end of the third unit resistor R3 may be disposed at the height h2. Additionally, each of the first unit resistor R1, the second unit resistor R2 and the third unit resistor R3 may be provided to form an angle with the bottom of the battery pack 50. That is, the first unit resistor R1, the second unit resistor R2 and the third unit resistor R3 may be provided to form an angle with the bottom of the detection resistor unit 100.

Through this configuration, the apparatus for detecting coolant leakage according to an embodiment of the present disclosure may reduce a detection error of coolant leakage height. In more detail, as shown in the configuration of FIG. 4, it is possible to detect a leakage height of h1+x between the leakage heights h1 and h2. Particularly, the apparatus for detecting coolant leakage according to an embodiment of the present disclosure may accurately detect an increase/decrease in leakage height when the coolant leakage height increases/decreases.

Figure 5:
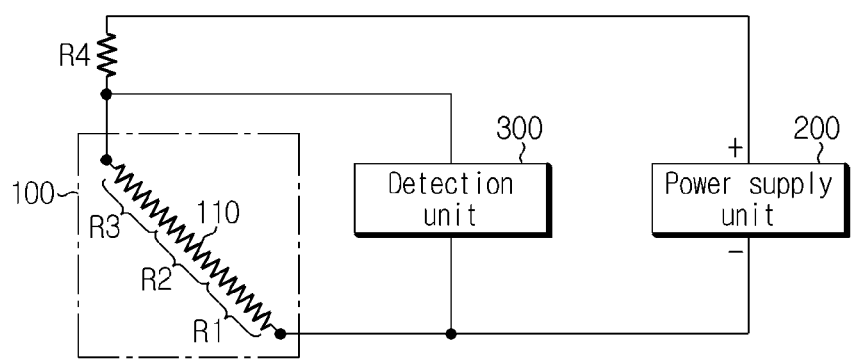
FIG. 5 is a schematic diagram showing a connection configuration of an apparatus for detecting coolant leakage according to an embodiment of the present disclosure.

FIG. 5 is a schematic diagram showing a connection configuration of the apparatus for detecting coolant leakage according to an embodiment of the present disclosure.

Referring to FIG. 5, the apparatus for detecting coolant leakage according to an embodiment of the present disclosure may further include a voltage division resistor R4.

The voltage division resistor R4 may be connected in series to the detection resistor unit 100. For example, as shown in the configuration of FIG. 5, the voltage division resistor R4 may be electrically directly connected in series to the detection resistor unit 100. Here, the power supply unit 200 may supply a predetermined power to the voltage division resistor R4 and the detection resistor unit 100.

Additionally, the detection unit 300 may measure the voltage value applied to two ends of the detection resistor unit 100 according to the voltage division principle. For example, as described above, when the resistance value of the detection resistor unit 100 reduces, the voltage value applied to the voltage division resistor R4 increases, and the voltage value applied to the detection resistor unit 100 reduces. In this instance, the detection unit 300 may detect a change in the resistance value of the detection resistor unit 100 based on a change in the voltage value applied to two ends of the detection resistor unit 100.

Through this configuration, the apparatus for detecting coolant leakage according to the present disclosure may detect whether the coolant leaks and the coolant leakage height using the resistor circuit that is convenient to implement and low cost.

Figure 6:
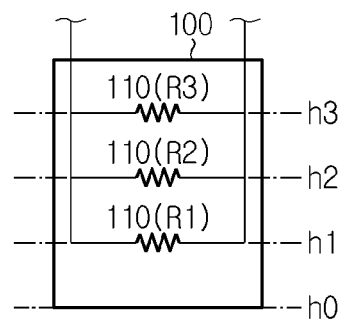
FIGS. 6 and 7 are schematic diagrams showing a configuration of a detection resistor unit according to another embodiment of the present disclosure.
Figure 7:
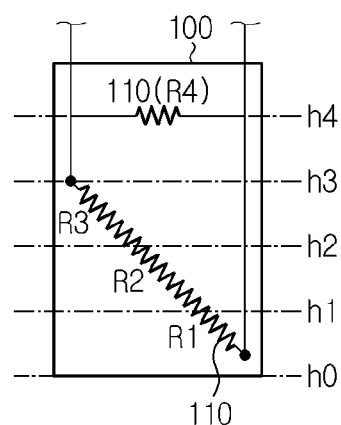

FIGS. 6 and 7 are schematic diagrams showing a configuration of a detection resistor unit according to another embodiment of the present disclosure.

Referring to FIGS. 6 and 7, the detection resistor unit according to the present disclosure may include a plurality of resistors connected in parallel.

For example, as shown in the configuration of FIG. 6, the detection resistor unit 100 may include a first unit resistor R1, a second unit resistor R2 and a third unit resistor R3 connected in parallel. Additionally, the first unit resistor R1, the second unit resistor R2 and the third unit resistor R3 may be configured such that they are disposed at different heights and parallel to the bottom of the battery pack 50. For example, as shown in the configuration of FIG. 6, the first unit resistor R1, the second unit resistor R2 and the third unit resistor R3 may be provided parallel to the bottom of the detection resistor unit 100.

Additionally, as shown in the configuration of FIG. 7, the detection resistor unit 100 according to an embodiment of the present disclosure may include a plurality of resistors 110 connected in parallel. Here, some of the plurality of resistors 110 may be configured parallel to the bottom of the battery pack 50. Additionally, the remaining resistors of the plurality of resistors 110 may be configured to form an angle with the bottom of the battery pack 50. For example, as shown in the configuration of FIG. 7, when the detection resistor unit 100 includes two resistors, the fourth unit resistor R4 may be configured parallel to the bottom of the battery pack 50, and one remaining resistor may be configured to form an angle with the bottom of the battery pack 50.

Through this configuration, in the apparatus for detecting coolant leakage according to the present disclosure, the plurality of resistors is connected in parallel and can be stably mounted. Additionally, the apparatus for detecting coolant leakage according to the present disclosure may effectively detect the coolant leakage height corresponding to a change in resistance value in a stepwise manner.

Figure 8:
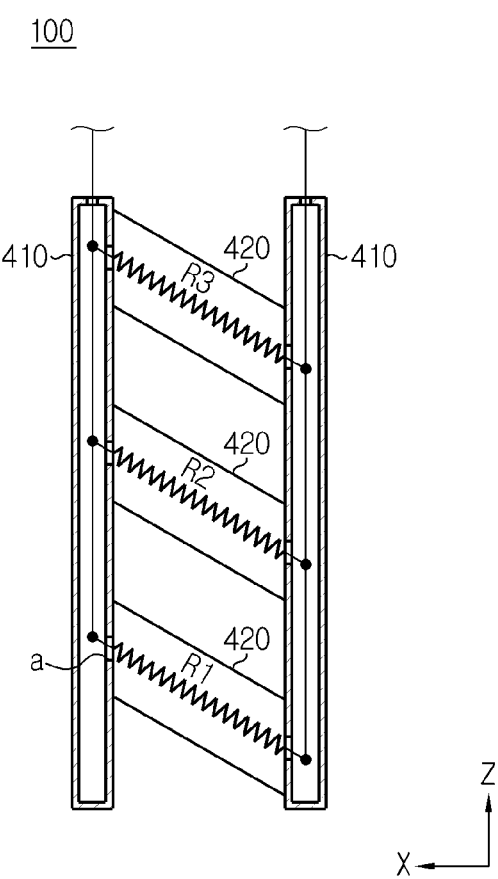
FIG. 8 is a schematic diagram showing a configuration of a detection resistor unit according to still another embodiment of the present disclosure.

FIG. 8 is a schematic diagram showing a configuration of a detection resistor unit according to still another embodiment of the present disclosure.

Referring to FIG. 8, the apparatus for detecting coolant leakage according to an embodiment of the present disclosure may further include a fixing unit.

The fixing unit may fix the detection resistor unit 100 to the battery pack 50 or the secondary battery 10. In more detail, the fixing unit may fix the mounting location of the detection resistor unit 100 mounted in the battery pack 50.

Preferably, the fixing unit may include a first fixing unit 410. The first fixing unit 410 may be mounted on two sides of the detection resistor unit 100. That is, the first fixing unit 410 may be mounted on the left and right sides the detection resistor unit 100. In more detail, the first fixing unit 410 may be mounted on two sides of the detection resistor unit 100 with at least one resistor provided in the detection resistor unit 100 interposed between. For example, as shown in the configuration of FIG. 8, the first fixing unit 410 may be mounted on two sides (the horizontal, x axis direction on the basis of FIG. 8) of the detection resistor unit 100. In more detail, the first fixing unit 410 may be provided on two sides of the first unit resistor R1, the second unit resistor R2 and the third unit resistor R3. In more detail, as shown in the configuration of FIG. 8, the first fixing unit 410 may be implemented in the shape of a long rod in the height-wise direction (the vertical direction, y axis direction on the basis of FIG. 8) from the bottom of the battery pack.

Additionally, the first fixing unit 410 may include a plurality of holes a. In more detail, the plurality of holes a may be configured such that a line connected to two ends of the resistor may be fixed. That is, the line connected to two ends of the resistor may be fixed to the plurality of holes a. For example, as shown in the configuration of FIG. 8, the first fixing unit 410 may include two holes a on two sides of each resistor.

Through this configuration, the first fixing unit 410 according to the present disclosure may fix the plurality of resistors at a predetermined interval so that the plurality of resistors provided in the detection resistor unit 100 may be mounted at different heights from the bottom of the battery pack.

More preferably, the fixing unit may include a second fixing unit 420. The second fixing unit 420 may include one resistor inside. That is, the mounting location of the resistor may be fixed by the second fixing unit 420. In this instance, the second fixing unit 420 may include a flow channel through which the coolant may be introduced.

Additionally, the second fixing unit 420 may form an angle with the bottom of the battery pack 50. Additionally, two ends of the second fixing unit 420 may be mounted in the holes a of the first fixing unit 410.

Through this configuration, the second fixing unit 420 according to the present disclosure may stably fix the plurality of resistors such that the plurality of resistors provided in the detection resistor unit 100 forms an angle with the bottom of the battery pack.

Preferably, the first fixing unit 410 and the second fixing unit 420 may fix a measurement line. The measurement line may electrically directly connect the plurality of resistors connected in parallel. Additionally, the measurement line may be a line that electrically directly connects the plurality of resistors 110 to the detection unit 300 and the power supply unit 200.

Through this configuration, the fixing unit may fix the detection resistor unit 100 so that the height of the plurality of resistors 110 provided in the detection resistor unit 100 does not change, to prevent the detection resistor unit 100 from moving due to vibration or impacts.

The apparatus for detecting coolant leakage according to the present disclosure itself may be provided in the battery pack. That is, the battery pack according to the present disclosure may include the apparatus for detecting coolant leakage according to the present disclosure as described above. Here, the battery pack may include a plurality of secondary batteries, the apparatus for detecting coolant leakage, electrical equipment (a BMS, a relay, a fuse, etc.) and a case.

Figure 9:
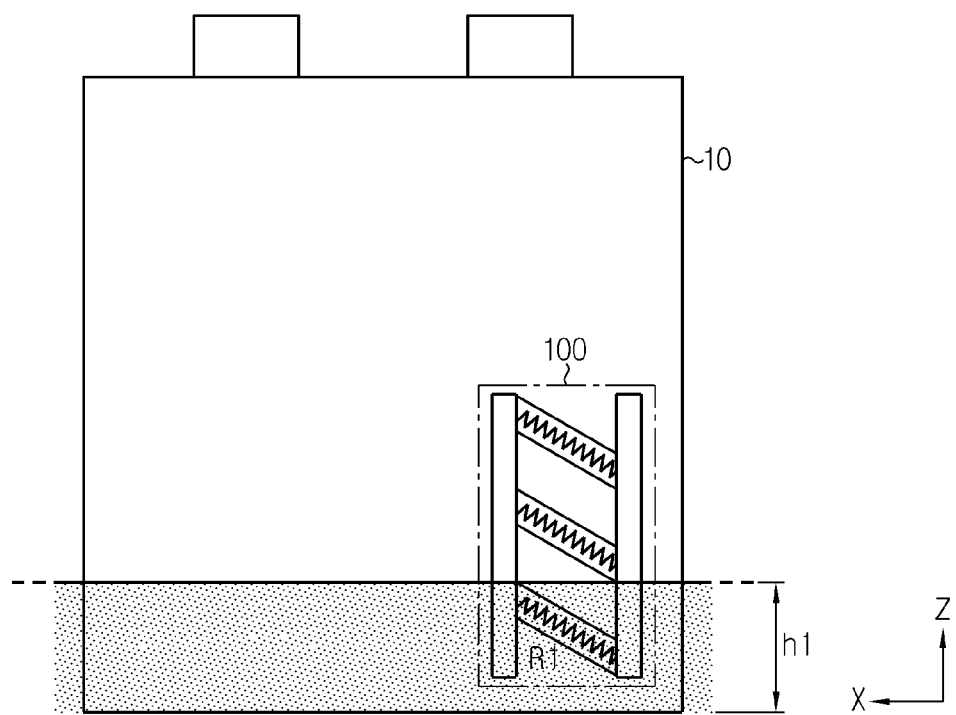
FIGS. 9 to 11 are diagrams showing examples of coolant leakage height detected by a detection resistor unit according to an embodiment of the present disclosure.
Figure 10:
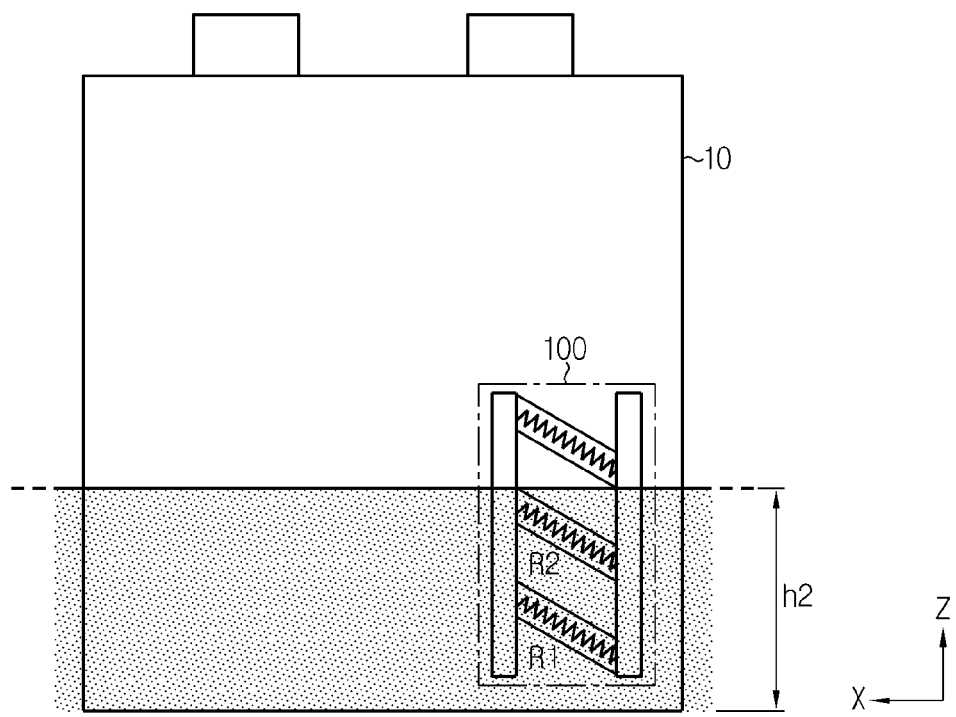
Figure 11:
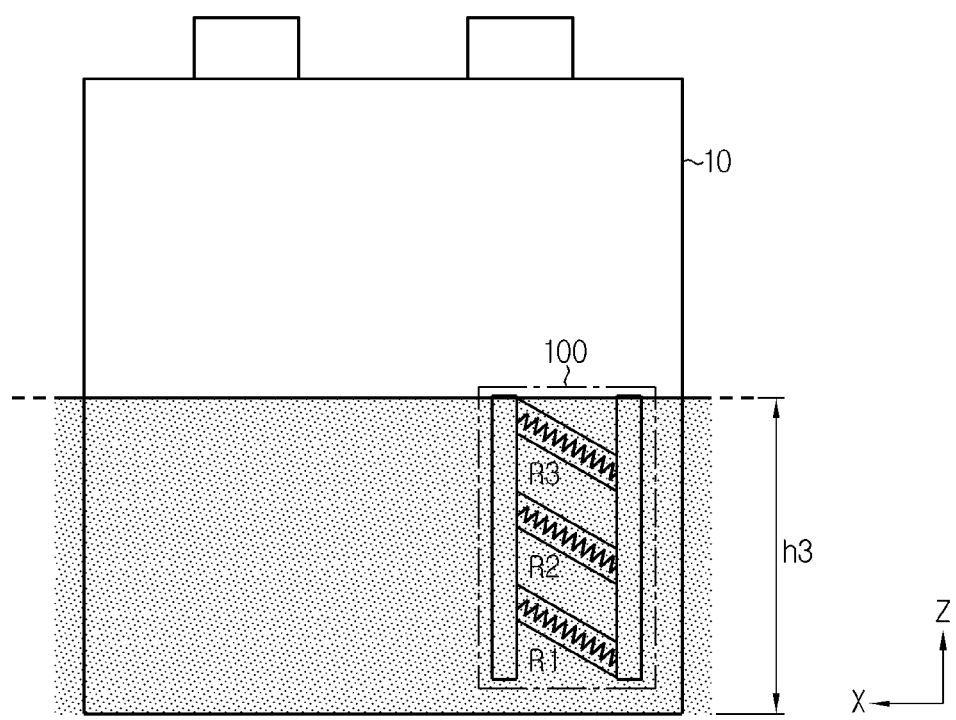

FIGS. 9 to 11 are diagrams showing examples of coolant leakage height detected by the detection resistor unit according to an embodiment of the present disclosure.

First, referring to FIG. 9, the apparatus for detecting coolant leakage according to an embodiment of the present disclosure may detect that the coolant leaked as much as the first height h1 in the battery pack. In more detail, the apparatus for detecting coolant leakage may detect the first unit resistor R1 submerged in the coolant, and detect that the coolant leaked as much as the first height h1. For example, when the first unit resistor R1 is submerged in the coolant, the apparatus for detecting coolant leakage may detect that the coolant leaked as much as the first height h1 based on a change in the resistance value of the detection resistor unit 100.

Referring to FIG. 10, the apparatus for detecting coolant leakage according to an embodiment of the present disclosure may detect that the coolant leaked as much as the second height h2 in the battery pack. In more detail, the apparatus for detecting coolant leakage may detect the first unit resistor R1 and the second unit resistor R2 submerged in the coolant, and detect that the coolant leaked as much as the second height h2. For example, when the first unit resistor R1 and the second unit resistor R2 are submerged in the coolant, the apparatus for detecting coolant leakage may detect that the coolant leaked as much as the second height h2 based on a change in the resistance value of the detection resistor unit 100.

Referring to FIG. 11, the apparatus for detecting coolant leakage according to an embodiment of the present disclosure may detect that the coolant leaked as much as the third height h3 in the battery pack. In more detail, the apparatus for detecting coolant leakage may detect the first unit resistor R1, the second unit resistor R2 and the third unit resistor R3 submerged in the coolant, and detect that the coolant leaked as much as the third height h3. For example, when the first unit resistor R1, the second unit resistor R2 and the third unit resistor R3 are submerged in the coolant, the apparatus for detecting coolant leakage may detect that the coolant leaked as much as the third height h3 based on a change in the resistance value of the detection resistor unit 100.

Additionally, when various control logics of the detection unit 300 are implemented in software, the detection unit 300 may be implemented as a set of program modules. In this instance, the program module may be stored in the memory device and executed by the processor.

Additionally, at least one of the various control logics of the detection unit 300 may be combined and the combined control logics may be written in computer-readable coding system and stored in computer-readable recording media. For example, the recording media includes at least one selected from the group consisting of ROM, RAM, register, CD-ROM, magnetic tape, hard disk, floppy disk and an optical data recording device. Additionally, the coding system may be stored and executed in computers connected via a network in distributed manner Additionally, functional programs, codes and code segments for implementing the combined control logics may be readily inferred by programmers in the technical field to which the present disclosure belongs.

Meanwhile, the terms indicating directions as used herein such as up, down, left, right, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and various modifications and changes may be made by those skilled in the art within the technical aspects of the present disclosure and the equivalent scope of the appended claims.

Although the term 'unit' such as 'detection unit' and 'memory unit' is used herein, it refers to a logical component unit, and it is obvious to those skilled in the art that the term does not necessarily indicate a component that may or should be physically separated.

DESCRIPTION OF REFERENCE NUMERALS

10: Secondary battery
50: Battery pack
100: Detection resistor unit
110: Resistor
200: Power supply unit
300: Detection unit
410: First fixing unit
420: Second fixing unit
a: Hole

What is claimed is:

1. An apparatus for detecting a height of a coolant leakage of a coolant flowing through a battery, wherein the height of the coolant leakage is along a first axis, the apparatus comprising;
    first and second vertical connection lines;
    a plurality of non-vertical electrical lines positioned within a battery pack, each non-vertical line extending along a respective axis that is not parallel to the first axis, and directly connecting a respective first node on the first vertical connection line to a respective second node on the second vertical connection line in an electrically parallel configuration; and
    a plurality of resistors positioned within the battery pack, wherein each non-vertical electrical line includes at least one resistor of the plurality of resistors, wherein at least two resistors of the plurality of resistors are configured such that the at least two resistors are disposed at different heights along the first axis from a lower end of the battery pack toward an upper end of the battery pack, wherein a resistance of the at least two resistors varies by at least one resistor of the at least two resistors coming into contact with the coolant, wherein the at least two resistors are configured to be connected to and receive power from a power supply; and
    a processor configured to:
        receive an electrical signal from the at least two resistors; and
        determine the depth of leaked coolant based on the electrical signal received from the at least two resistors.

2. The apparatus according to claim 1, wherein, for each non-vertical electrical line, the respective first node is positioned at a height greater than the respective second node along the first axis.

3. The apparatus according to claim 1, wherein for each non-vertical electrical line, its respective first node is positioned at a height greater than its respective second node.

4. The apparatus according to claim 1, wherein the at least two resistors are positioned at least partially in a lower end of a secondary battery provided in the battery pack.

5. The apparatus according to claim 1, wherein the processor is configured to determine the depth of the leaked coolant based on a change in a resistance value of the at least two resistors.

6. The apparatus according to claim 5, further comprising memory configured to pre-store the resistance value, a respective coolant height corresponding to the resistance value and a respective indication of whether there is a coolant leak corresponding to the resistance value, wherein the processor is configured to:
   calculate the resistance value of the plurality of resistors based on the electrical signal received from the plurality of resistors; and
   detect the coolant leak and determine the coolant height based on the calculated resistance value and the pre-stored resistance value.

7. The apparatus according to claim 1, further comprising the power supply, wherein the power supply is configured to supply power to the plurality of resistors.

8. A battery pack comprising:
   the apparatus according to claim 7; and
   the battery.

9. The apparatus according to claim 1, further comprising memory configured to pre-store a plurality of resistance values and a plurality of coolant heights corresponding to the plurality of resistance values in a one-to-one correspondence, wherein the processor is configured to:
   calculate the resistance value of the plurality of resistors to be between two of the plurality of resistance values based on the electrical signal received from the plurality of resistors; and
   determine the height of the coolant leakage between two of the plurality of coolant heights based on the calculated resistance value and said two of the plurality of resistance values.

10. The apparatus according to claim 9, wherein an angle formed between a horizontal direction and a length of at least one non-vertical electrical line is an acute angle.

11. The apparatus according to claim 1, wherein the plurality of non-vertical electrical lines comprises first and second non-vertical electrical lines, and wherein the second node of the first non-vertical electrical line and the first node of the second non-vertical electrical line are positioned at a common height along the first axis.

12. The apparatus according to claim 1, further comprising two first fixing units, wherein the two first fixing units are configured to:
   include the first and second vertical connection lines, respectively, and
   fix the first and second vertical connection lines, respectively.

13. The apparatus according to claim 12, further comprising:
   a plurality of second fixing units, wherein the plurality of second fixing units is configured to:
      include the at least one non-vertical electrical line, respectively, and
      fix the at least one non-vertical electrical line.

* * * * *